(12) United States Patent
Lyon et al.

(10) Patent No.: US 10,291,708 B1
(45) Date of Patent: May 14, 2019

(54) MULTI-NODE VIRTUAL DATA STORAGE APPLIANCE WITH INTERNAL COMMUNICATIONS FILTERING

(71) Applicant: EMC IP Holding Company LLC, Hopkinton, MA (US)

(72) Inventors: Jared C. Lyon, Brighton, MA (US); Jochen F. De Smet, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 276 days.

(21) Appl. No.: 15/189,663

(22) Filed: Jun. 22, 2016

(51) Int. Cl.
*G06F 15/173* (2006.01)
*H04L 29/08* (2006.01)
*H04L 12/58* (2006.01)
*H04L 29/12* (2006.01)

(52) U.S. Cl.
CPC .......... *H04L 67/1097* (2013.01); *H04L 51/12* (2013.01); *H04L 61/103* (2013.01)

(58) Field of Classification Search
USPC ........................................................ 709/223
See application file for complete search history.

(56) References Cited

U.S. PATENT DOCUMENTS

| 8,839,241 B2 | 9/2014 | LeMahieu et al. |
| 8,910,157 B2 | 12/2014 | Ciano et al. |
| 2009/0222560 A1 | 9/2009 | Gopisetty et al. |
| 2011/0004676 A1 | 1/2011 | Kawato |

*Primary Examiner* — Hee Soo Kim
(74) *Attorney, Agent, or Firm* — BainwoodHuang

(57) ABSTRACT

A storage processor of a set of virtual-machine-implemented storage processors (SPs) of a virtual storage appliance (VSA) is operated to avoid potential mis-communications among non-peer SPs in a virtualized environment having multiple VSAs. An operating method includes receiving a peer-SP identifier that uniquely identifies a peer storage processor of the VSA in network packets sent by the peer storage processor via an internal inter-SP network. The peer-SP identifier, which may be a machine-level network address such as a MAC address, is used to configure a network firewall to accept peer-SP packets and reject non-peer-SP packets from the internal inter-SP network. The network firewall is subsequently operated as configured to accept the peer-SP packets for delivery to the main operating logic of the one storage processor and to reject the non-peer-SP network packets.

21 Claims, 7 Drawing Sheets

MULTI-NODE VIRTUAL DATA STORAGE APPLIANCE WITH INTERNAL COMMUNICATIONS FILTERING

BACKGROUND

The present invention is related to the field of data storage systems.

Data storage systems have long been specialized, purpose-built hardware devices specifically tailored for providing secondary storage to separate host computer systems. Common examples include (1) an integrated cached disk array (ICDA), which includes an array of physical disk drives, semiconductor storage cache, and storage processors interfacing to the host computers using storage-oriented protocols, and (2) network-attached storage or NAS, which has generally similar structure while providing a network-oriented connection (e.g., TCP-IP) and typically a distributed file system (e.g., CIFS) interface to the hosts.

There is an industry trend toward so-called software-defined storage, in which data storage is provided by specialized software-implemented (or "virtualized") appliances using more generic hardware. In some cases, a virtualized storage appliance may execute substantially the same software image as a corresponding purpose-built storage system, with modification as necessary to accommodate the generic underlying hardware substituted for the more specialized purpose-built hardware.

SUMMARY

One type of data storage system employs multiple storage processors that exhibit both independence and certain interdependence in operation. The storage processors run separate instances of an operating system and other software infrastructure, as well as separate instances of data storage applications that provide value-added storage services to external requestors. The storage processors are at the same time configured to serve as backups to each other, improving system availability. Thus if one storage processor should fail, for example, the other can continue to operate and handle all storage requests until corrective action is taken.

One feature of such multiple-storage-processor systems is use of a set of inter-SP connections providing for certain inter-communications among the storage processors. The inter-SP connections include distinct interfaces for respective inter-SP communications or functions, including for example heartbeat (split brain avoidance) and high-availability (HA) connections to guard against single point of failure. In a purpose-built system, inter-SP connections may be provided using a hardware interface such as a PCI bus. The inter-SP connections are private and essentially controlled by the storage system manufacturer, so the SPs can assume the existence of the connections as well as their proper configuration for use. In the virtualized environment of a virtual storage appliance (VSA), the inter-SP connections may be provided using networking-related facilities of a virtualizer (e.g., hypervisor), such as a virtual switch. These facilities are not manufacturer-controlled and in fact are typically created/configured by a person from an end-user organization, such as a network or system administrator. This means that there is risk of mis-configuration of inter-SP connections, such as inadvertently connecting the SPs of different VSAs together. Such mis-configuration can create incoherent communications that could adversely affect system operation.

More specifically, a multi-node VSA has an internal network that is used for communications between peer SPs. Each peer may be given a known static IP address on a reserved subnet at initialization time, with nodes of one type using one IP address and nodes of another type using another IP address. If multiple VSAs were deployed on the same internal network, there would be IP address conflicts and the SPs could end up talking to the wrong peer. While this risk could be addressed by arranging the VSA nodes on an isolated network or VLAN, such an approach requires at least one unique VLAN for every multi-SP VSA deployment, and it still allows for misconfiguration which could lead to incorrect initialization of a VSA.

A method is disclosed of operating one storage processor of a set of virtual-machine-implemented storage processors of a virtual storage appliance (VSA), where each storage processor includes main operating logic and a network interface. The method is directed to avoiding potential mis-communications among non-peer SPs in a virtualized environment having multiple VSAs, and doing so in a relatively simple and straightforward way that reduces risk of mis-configuration by an administrative user.

The method includes, by one storage processor of a multi-SP VSA, receiving a peer-SP identifier that uniquely identifies a peer storage processor of the VSA in network packets sent by the peer storage processor via an internal inter-SP network. The peer-SP identifier is used to configure a network firewall of the one storage processor to accept peer-SP packets and reject non-peer-SP packets from the internal inter-SP network, the peer-SP packets containing the peer-SP identifier as an identifier of a packet sender, the non-peer-SP packets not containing the peer-SP identifier as an identifier of a packet sender. The network firewall is subsequently operated as configured to accept the peer-SP packets for delivery to the main operating logic of the one storage processor and to reject the non-peer-SP network packets.

By the above method, potential mis-communication between SPs of different VSAs is avoided, which proper communications between true peer SPs of a given VSA are enabled.

In one embodiment, the inter-SP network is realized by a virtual network switch configured to forward the network packets sent by the peer storage processor to the one storage processor. The storage processors may be executed on respective distinct host computers, and the virtual network switch may be a distributed virtual network switch including a physical network switch interconnecting the host computers, along with respective virtual-switch functions within the host computers.

In one embodiment, the network packets may include a network-level address of a packet sender and a machine-level address of the packet sender, the network-level address being a statically assigned network address shared by storage processors of different virtual storage appliances, the machine-level address being unique to each storage processor and serving as the peer-SP identifier identifying the peer-SP packets. In one example the network-level address is the so-called Media Access Control (MAC) address of a network interface of the SP. The storage appliances may include respective pairs of storage processors denoted A and B, the A storage processors of the storage appliances using a first statically assigned network address, and the B storage processors of the storage appliances using a second distinct statically assigned network address.

The storage processors may have access to a shared storage area to which the storage processors write respective peer-SP identifiers, and a peer-SP identifier can be received by reading the peer-SP identifier of the peer storage processor from the shared storage area.

The network packets may include a machine-level address of the packet sender, the machine-level address being unique to each storage processor and serving as the peer-SP identifier written to and read from the shared storage area. The peer-SP identifier may be used to configure the network firewall by configuring an instance of iptables network-address filtering. The method may also include statically updating an Address Resolution Protocol (ARP) table to only send packets to the machine-level address unique to the peer storage processor.

Additionally, the method may further include polling the shared storage area for a change of the machine-level address of the peer storage processor, and upon the polling detecting a change of the machine-level address, updating the configuration of the network firewall to reflect the change of the machine-level address.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
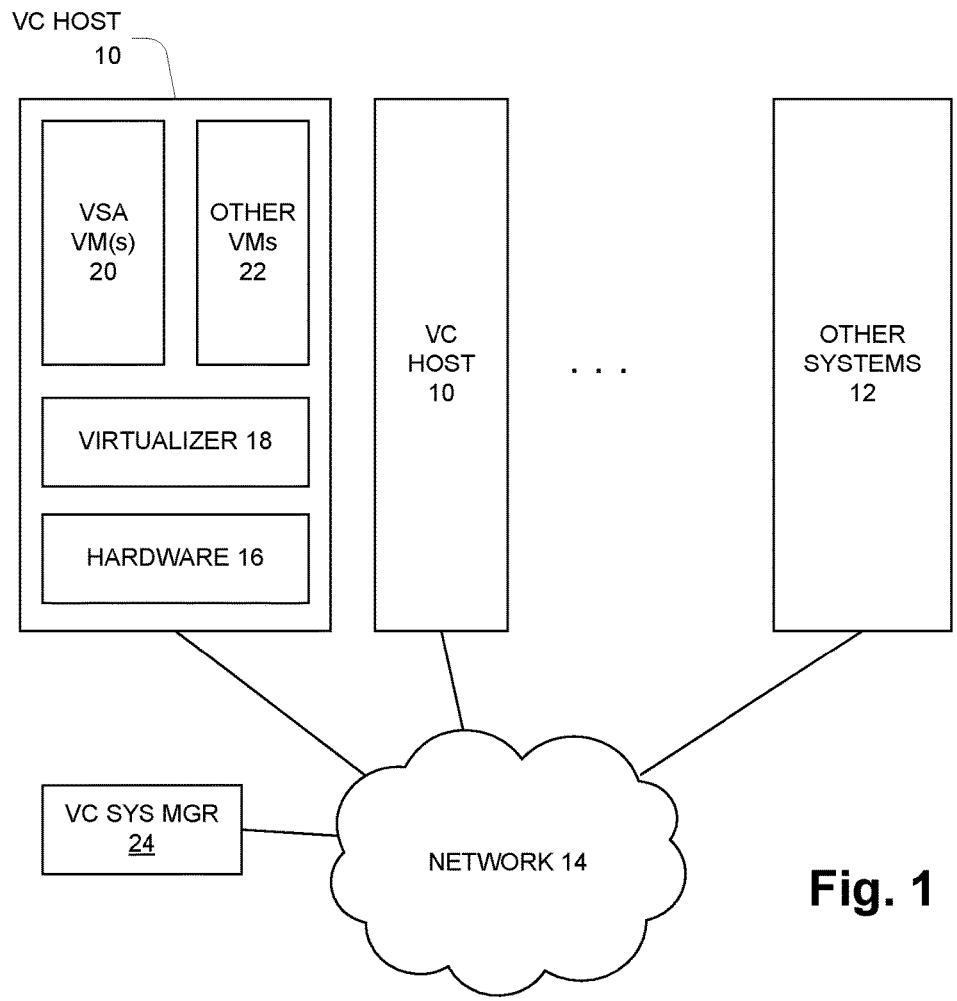
FIG. 1 is a block diagram of a computer system.

FIG. 1 shows a computing system including specialized host computers shown as virtual computing (VC) hosts 10 and other systems 12 interconnected by a network 14. As shown, a VC host 10 includes hardware 16 (such as processors, memory, interface circuitry, etc.), and software-implemented components including a virtualizer 18 and virtual machines (VMs) shown as virtual storage appliance (VSA) VMs 20 and other VMs 22. The other VMs 22 may include additional VSA VMs 20, and/or VMs configured for other dedicated or general purposes, such as network appliances, specialized application servers such as database servers, etc. The other systems 12, when present, may include specialized components such as data storage systems, network devices, application-specific components for supporting specific deployments, etc. The VSA VMs 20 provide storage services to applications executing on either the same VC hosts 10 or other hosts (not shown).

The virtualizer 18 of the VC host 10 provides an operating environment presenting abstracted or "virtual" resources to the VMs 20, 22 using real resources of the hardware 16 and other physical system components such as network 14 and other systems 12. In one class of VC host 10, the virtualizer 18 is realized using a type I hypervisor, which is generally understood as interfacing directly with the hardware 16 without intermediation by a separate host operating system. Other classes of VC hosts 10 employ other configurations.

A VSA including one or more VSA VMs 20 is a software-implemented data storage appliance, analogous to conventional standalone hardware storage appliances such as network attached storage (NAS) boxes, integrated cached disk arrays (ICDAs), etc. In one type of embodiment, a VSA is implemented using a software image also usable to realize such dedicated hardware storage appliances, which provide a "dedicated" or "purpose-built" environment in contrast to the "virtual" or "general-purpose" environment that is the primary subject of this description. A VSA uses underlying storage resources to present value-added storage-related services to applications executing in a data processing system. Value-added services can cover a broad range including RAID, data deduplication, compression, clustering and failover, etc. Thus a VSA is a consumer of lower-level storage resources such as plain virtual disks, and a provider of higher-level storage resources to applications executing in the system.

Physical data storage needs of the system are generally provided by some combination of so-called "direct attached" storage at the VC hosts 10 and network-accessed storage such as purpose-built storage appliances (NAS, ICDAs, etc.) that may be included in other systems 12. In particular, the virtualizer 18 is responsible for understanding the physical storage resources available in the system and using the storage resources to provide virtual storage to the VSA VMs 20.

Also shown in FIG. 1 is a VC system manager (VC SYS MGR) 24, which is a collection of one or more computers executing special system-management software for managing the virtual-computing system including the VC hosts 10, virtualizers 18 and individual VMs 20, 22. In operation, the VC system manager 24 responds to actions of a system management user to accomplish tasks such as creating or "deploying" new VMs 20, 22, which includes assigning virtualized resources backed by corresponding physical resources, configuring network connections and related parameters, etc.

Figure 2:
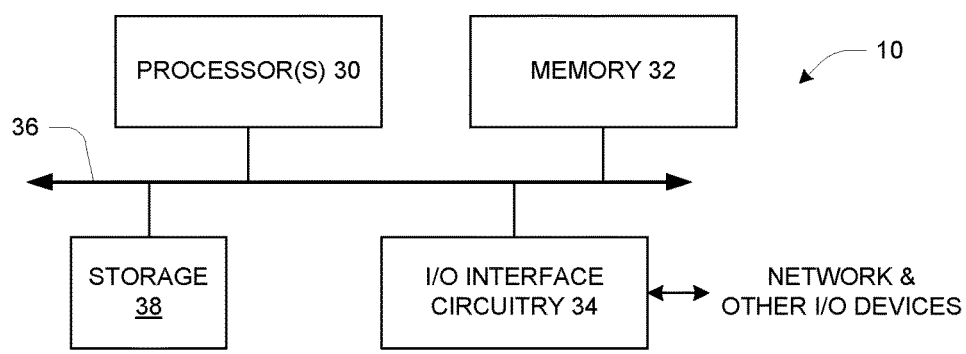
FIG. 2 is a hardware-oriented block diagram of a computer.

FIG. 2 shows an example configuration of a VC host 10 from a computer hardware perspective. The hardware includes one or more processors 30, memory 32, and interface circuitry 34 interconnected by data interconnections 36 such as one or more high-speed data buses. The interface circuitry 34 provides a hardware connection to the network 14 (FIG. 1) and perhaps other external devices/connections (EXT DEVs). The processor(s) 30 with connected memory 32 may also be referred to as "processing circuitry" herein. There may also be local or direct-attached storage 38 such as local-attached disk drives or Flash drives. In operation, the memory 32 stores data and instructions of system software (e.g., operating system, hypervisor, etc.) and one or more application programs which are executed by the processor(s) 30 to cause the hardware to function in a software-defined manner.

Figure 3:
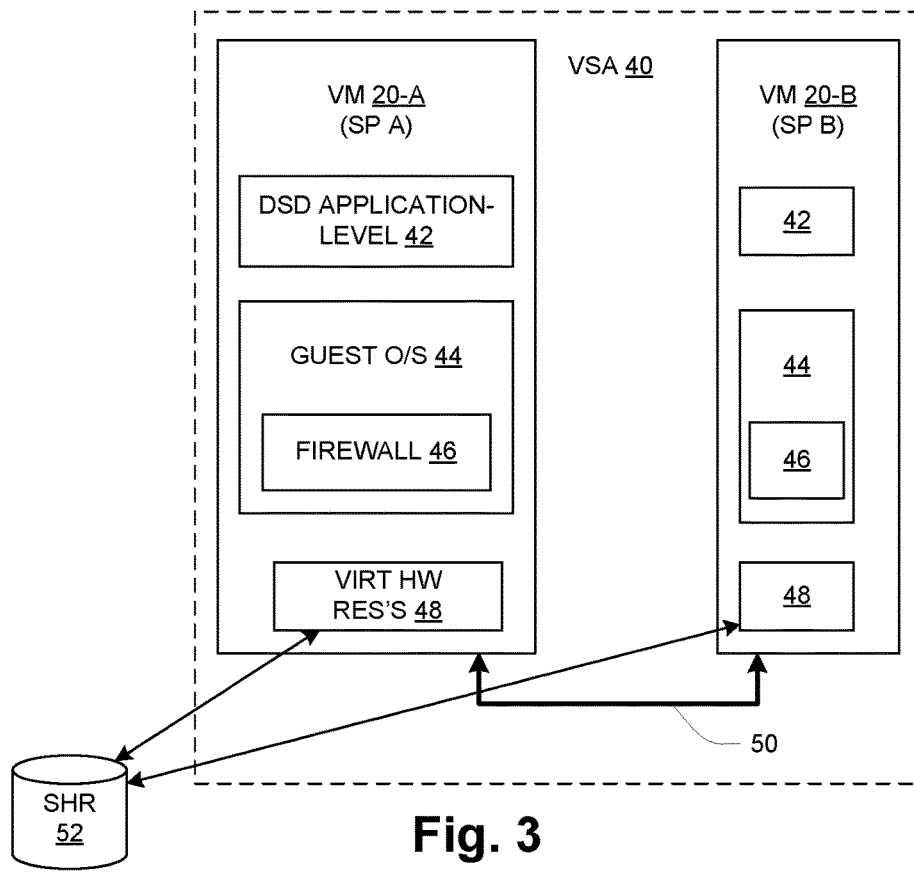
FIG. 3 is a block diagram of a virtual storage appliance (VSA)

FIG. 3 shows structure related to a VSA 40. In the illustrated example it includes two VSA VMs 20, shown as VM 20-A and 20-B. These embody certain data storage processing functionality and thus are also referred to herein as respective "storage processors" or SPs, indicated as SP A and SP B. The letters A and B in this context are merely enumerators of the members of each VSA. There may be little or no functional difference between SP A and SP B, although as described below they may use distinct network-level addresses for inter-SP communications. The SPs of a given VSA 40 are referred to as "peers", while SPs residing in different VSAs are not peers.

Each SP includes data storage device (DSD) application-level components 42, and a guest operating system (O/S) 44 which includes a firewall 46. Each SP also includes respective virtualized hardware (HW) resources 48 as noted above, i.e., virtual hardware resources made available to the VM 20 by the virtualizer 18 using a combination if its real hardware resources 16. The virtualized hardware resources 48 of the VMs 20 along with a set of dedicated inter-SP connections 50 may be viewed as a "platform" on which the higher-level components (such as DSD application level 42) execute. The platform is analogous to the set of hardware components and resources in a purpose-built data storage device.

The inter-SP connections 50 include multiple distinct interfaces for respective inter-SP communications or functions, including for example heartbeat (split brain avoidance) and high-availability (HA) connections to guard against single point of failure. In a purpose-built system, inter-SP connections may be provided using a hardware interface such as a PCI bus. In the virtualized environment, the inter-SP connections 50 are provided using facilities of the virtualizer 18 for providing networking, i.e., a virtual switch, with the SPs being assigned to respective port groups. In the case that the platform resides completely within one VC host 10, the virtual switch also resides within that VC host 10 and uses its hardware resources. An alternative arrangement is described below in which the VSA 40 and platform extend across multiple VC hosts 10, in which case the virtual switch becomes distributed and relies in part on a separate physical switch interconnecting the VC hosts 10.

In one embodiment, the SPs may be configured with known static IP addresses, which are referred to as IP A and IP B for SP A and SP B respectively. Using this technique, for inter-SP communications each SP can simply use the respective known static network address when sending messages to its peer SP, i.e., SP A sends network messages to IP B, and SP B sends network messages to IP A. This arrangement may be a legacy from purpose-built systems having only two SPs per hardware enclosure and a guaranteed private inter-SP connection. Within a given enclosure, a message sent to IP B can be directed to only one SP B, which is the peer SP and the intended recipient. In the virtualized environment, the same-type SPs of different VSAs (i.e., an SP A from one VSA 40 and an SP A from another VSA) both use the same network address (e.g., IP A). Because different VSAs 40 might co-reside on a VC host 10 or otherwise sharing hardware resources, there is the potential for a message sent to IP B to be sent to the wrong SP B. This potential problem and its solution are described more below.

Also shown in FIG. 3 is a shared storage device (SHR) 52 accessible by both VMs 20-A, 20-B. The shared storage device 52 may be a "system" device used for storing functional components (O/S, applications, etc.) of the VSA 40 and distinct from other storage devices used to provide underlying storage for virtual disks presented to the VMs 20 for use in providing value-added storage to system applications as described above. In one particular use, the shared storage device 52 is used to communicate certain network-related information to the VMs 20 as described more below.

Figure 4:
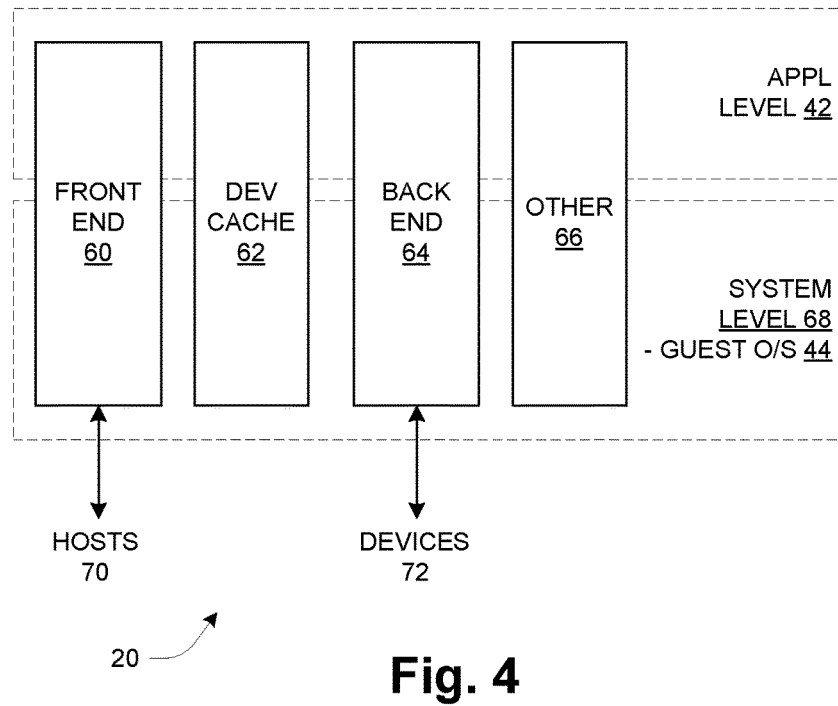
FIG. 4 is a block diagram of a storage processor.

FIG. 4 shows another view of SP organization, with functionality pertaining to different aspects of processing storage requests from hosts. An SP includes a variety of software-implemented components shown as a front end 60, device cache 62, back end 64, and other 66. These components collectively provide the above-described value-added storage functionality of the VSA 40. Each component has sub-components or modules divided between DSD application level 42 and system level 68, which refers to the local operating environment provided by the guest O/S 44 for example.

Generally, the front end 60 provides functionality for desired interface(s) to host applications (HOSTS) 70, and may support a block-based communications protocol such as iSCSI or a NAS protocol such as CIFS. It may also implement virtual-storage oriented protocols. The front end 60 uses internal mechanisms to realize the underlying storage functionality. One of the internal mechanisms may be the device cache 62, which caches data of underlying storage devices accessed via the back end 64 to make the data more quickly available, increasing performance. The back end 64 interfaces to the storage resources, such as virtual disks, provided by the virtualizer 18. These storage resources are shown as "devices" 72 in FIG. 4. The other components 66 include things like management and service components, general O/S components or libraries, and utilities.

Referring again to FIG. 3, the illustrated structure of a VSA 40 can be realized on one or more VC hosts 10. In the case of a single-host implementation, the two VMs 20-A, 20-B both execute on a VC host 10, and the inter-SP connections 50 can be realized using a standard virtual switch executing on the same VC host 10. It should also be noted at this point that a VSA 40 may be realized using only one SP rather than a pair SP A, SP B as illustrated. In that case, the platform need not provide the inter-SP connections 50, and related functionality of the SPs is generally disabled. These two distinct configurations may be referred to as "single node" and "dual node" respectively.

Figure 5:
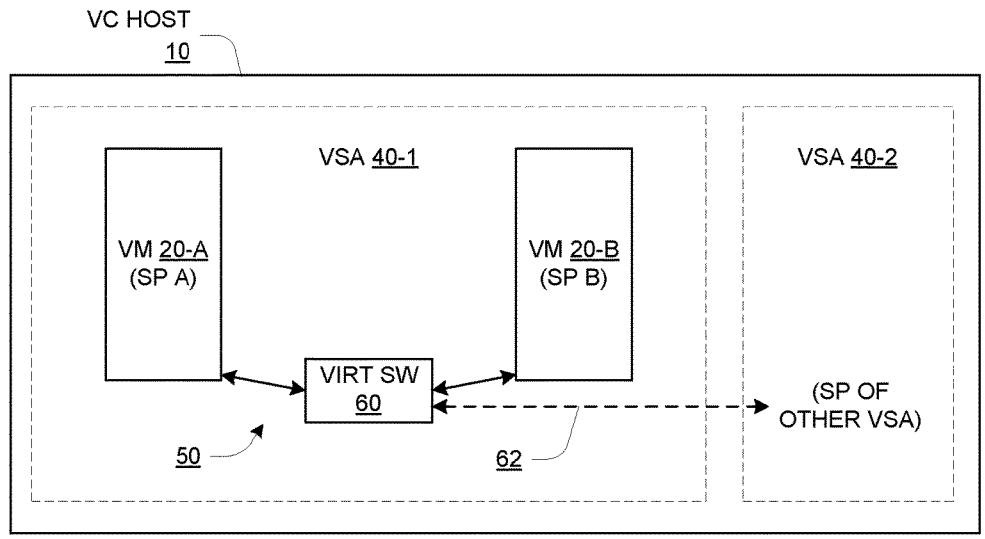
FIG. 5 is a block diagram of a single-host VSA with internal virtual switch.
Figure 6:
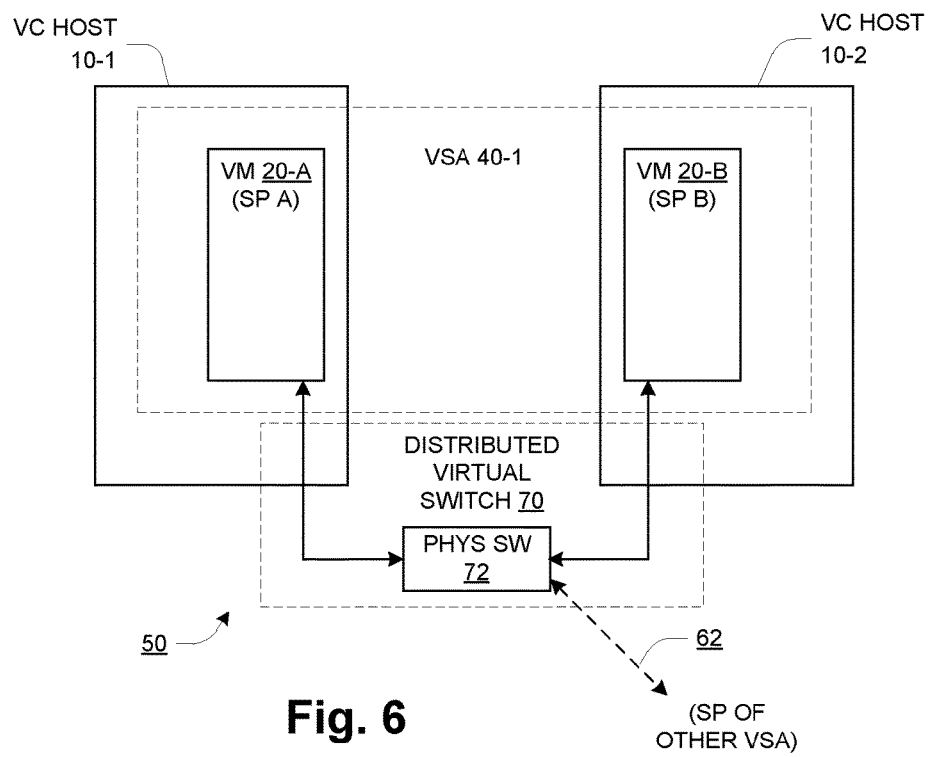
FIG. 6 is a block diagram of a multiple-host VSA with distributed virtual switch.

FIGS. 5 and 6 show different system arrangements in which there may be risk of mis-configuration that can cause problems in operation.

FIG. 5 shows a first arrangement in which a first VSA 40-1 co-resides with a second VSA 40-2 on a VC host 10. The first VSA 40-1 is a dual-node VSA having two VMs 20-A, 20-B implementing SP A and SP B respectively. The inter-SP connections 50 are provided by a virtual switch 60. As explained above, the SPs may be configured with known static IP addresses, which are referred to as IP A and IP B for SP A and SP B respectively. Using this technique, for inter-SP communications each SP can simply use the respective known static network address when sending messages to its peer SP, i.e., SP A sends network messages to IP B, and SP B sends network messages to IP A. Each SP may assume privacy of the inter-SP connections 50 and not perform any checking for improper communications, which is safe in the purpose-built environment. But with this arrangement there is a risk of potential mis-communication if an SP of another VSA 40-2 is somehow connected to the virtual switch 60 of VSA 40-1, which is indicated in FIG. 5 by a dotted-line connection 62. This could occur by an erroneous action of a system administrator, for example, incorrectly connecting some other VM to the private inter-SP connections 50. In this case, for example, SP A (VM 20-A) might receive a message indicating SP B as the source, but in fact the message was sent by SP B of VSA 40-2 rather than by SP B (VM 20-B) of VSA 40-1. Given that the VSAs 40 operate generally independently, any such mis-communications would be incoherent in relation to whatever processing is occurring at a receiving SP, and thus could cause major disruption to operation of the affected VSAs 40.

FIG. 6 shows a second arrangement having a similar risk. In this case the VMs 20 of VSA 40-1 are distributed across multiple VC hosts 10, and the inter-SP connection is made by a distributed virtual switch 70 including an off-host physical switch 72. Even in this arrangement there is the possibility of the incorrect connection 62 being made, leading to the above-described mis-communication problem.

Generally the above risk is addressed by use of the firewalls 46 of FIG. 3, specifically by configuring them to accept messages from only peer SPs and to reject messages sent by non-peer SPs. In order to configure the firewalls 46 properly, it is necessary for each SP to obtain a unique identifier for the peer SP that can be used in filtering network traffic. As explained above, the source IP address is not sufficient for this purpose when each SP of a given type (A or B) uses the same static IP address. In one embodiment, so-called MAC (Media Access Control) addresses are used as SP identifiers, as these are uniquely assigned to respective network interfaces of the VMs 20, and they also appear in network messages and thus distinguish the sources of the messages accordingly.

Figure 7:
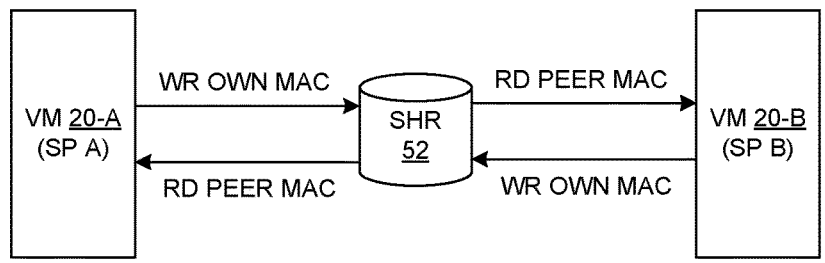
FIG. 7 is a schematic depiction of communication of network addresses between SPs.

FIG. 7 illustrates use of the shared device 52 by the VMs 20-A, 20-B of a VSA 40. In particular, the shared device 52 is used by each VM 20 to communicate its machine-level network address, shown as the MAC address in the illustrated example, to the peer VM 20. In particular, each VM 20 writes its own MAC address to the shared device 52 and reads its peer's MAC address from the shared device 52 (after it has been written by the peer). This exchange can occur early in initialization of each VM 20. The purpose of the exchange is to enable each VM 20 to configure its respective firewall 46 (FIG. 3) to accept inter-SP communications from only the peer SP of the same VSA, and to reject any attempted inter-SP communications from SPs of other VSAs. Notwithstanding that all SP A's use the same network-level address IP A, and likewise all SP B's use the same network-level address IP B, the MAC addresses are generally unique to each network interface and VM 20. Thus, a network message sent by SP B of VSA 20-1 may use the common IP address IP B but it will also include the unique machine-level MAC address MAC B1, whereas a message sent by SP B of another VSA 20-2 will include a different MAC address MAC B2. The sources of the messages can be distinguished on this basis, avoiding mis-communication of the above-described type.

Figure 8:
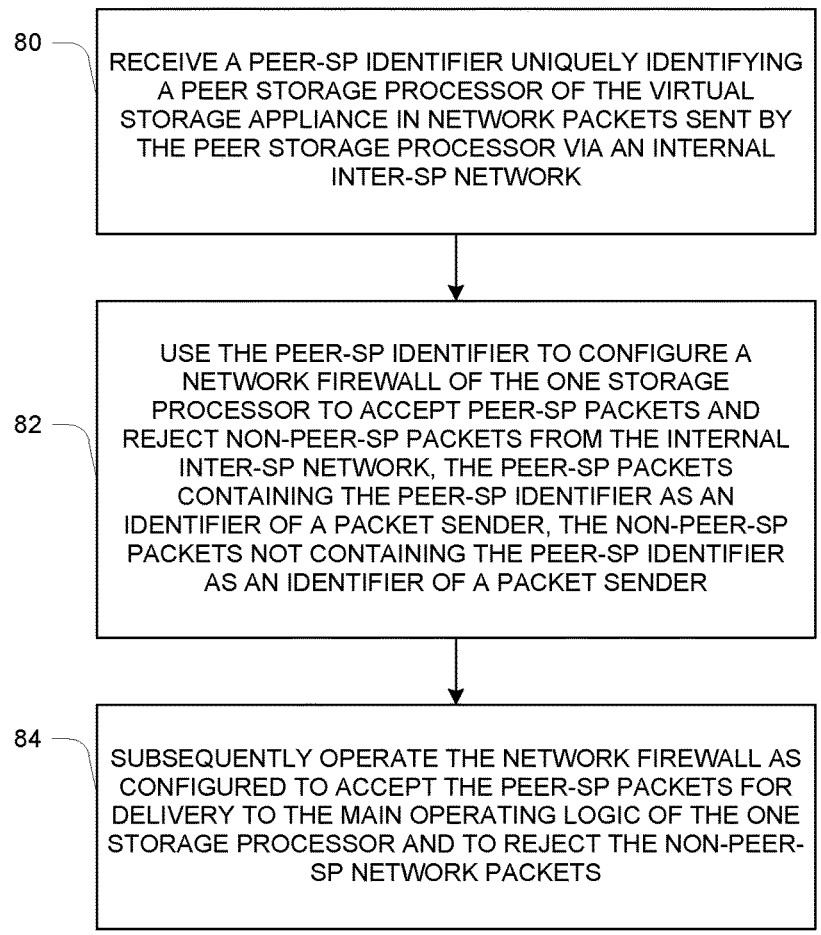
FIG. 8 is a flow diagram of overall operation for preventing mis-communication among non-peer SPs.

FIG. 8 describes the operation at a high level.

At 80, an SP receives a peer-SP identifier uniquely identifying a peer storage processor of the virtual storage appliance in network packets sent by the peer storage processor via an internal inter-SP network. In one embodiment, the peer-SP identifier is a MAC address and the identifier is received by reading it from a shared device, as described above. Other types of identifier and other mechanisms for receiving the peer-SP identifier may be used.

At 82, the SP uses the peer-SP identifier to configure a network firewall to accept peer-SP packets and reject non-peer-SP packets from the internal inter-SP network, where the peer-SP packets contain the peer-SP identifier as an identifier of a packet sender, the non-peer-SP packets do not contain the peer-SP identifier as an identifier of a packet sender. Again, in one example the identifiers are MAC addresses, which are included in packet headers as generally known in the art.

At 84, the network firewall is subsequently operated as configured to accept the peer-SP packets for delivery to main operating logic of the one storage processor and to reject the non-peer-SP network packets. In this context "main operating logic" refers to higher-level functional components such as the DSD application level components 42 shown in FIG. 3.

Figure 9:
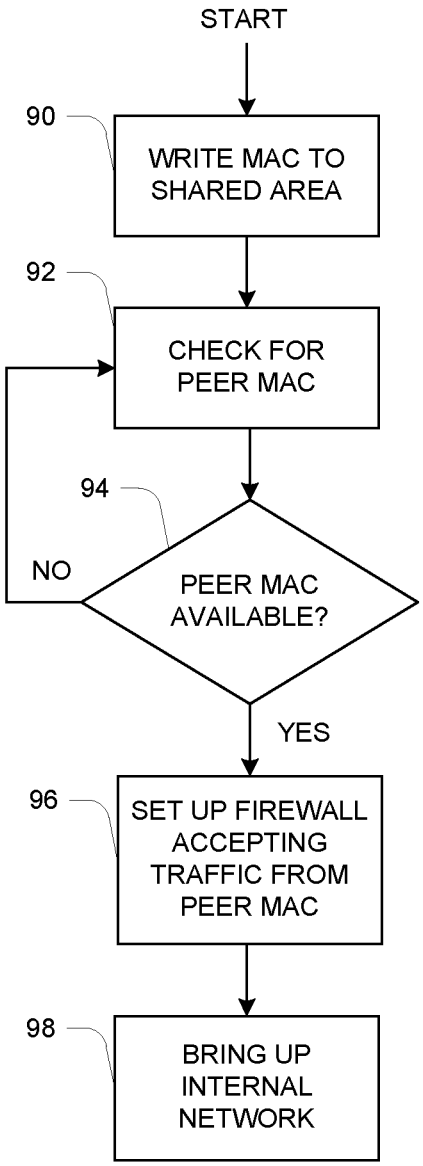
FIGS. 9-11 are flow diagrams of specific aspects of operation for preventing mis-communication among non-peer SPs.
Figure 10:
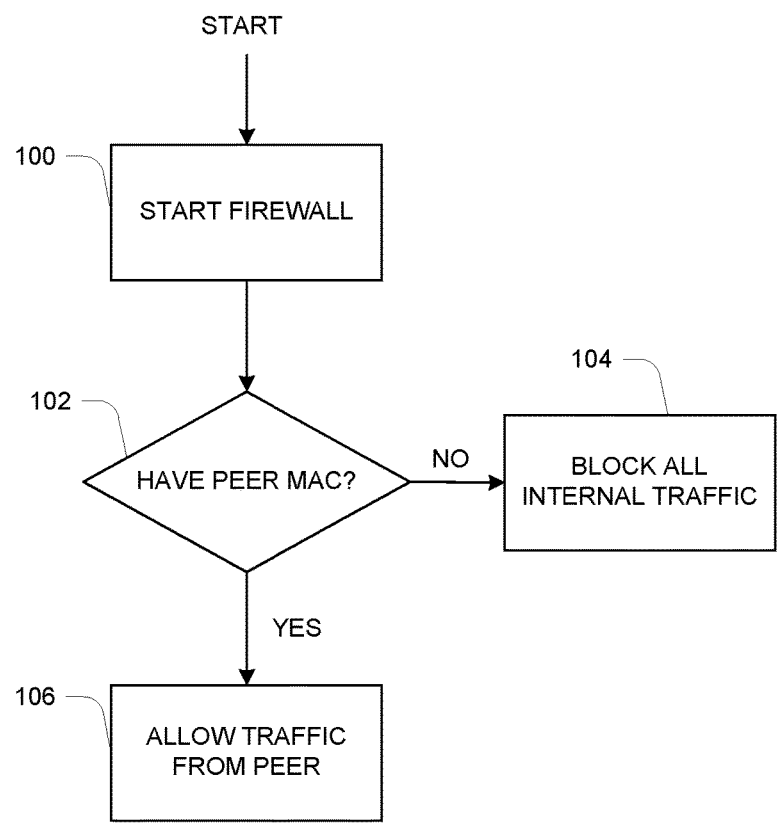
Figure 11:
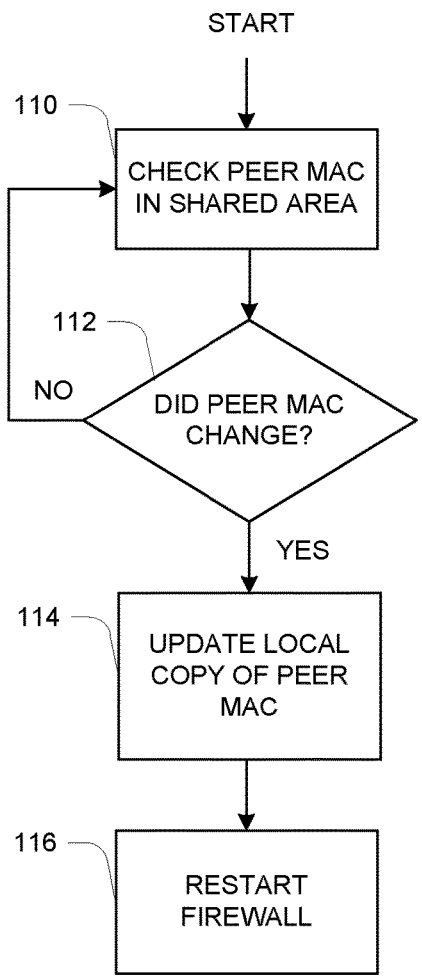

FIGS. 9-11 show more specific details of operations within the general scheme of FIG. 8.

FIG. 9 illustrates initialization-related processing, during which the peer-SP identifier is obtained and used to configure the local firewall 46. At 90, an SP writes its own MAC address to a shared area, e.g., shared device 52. At 92-94, the SP checks whether the MAC address of the peer SP is available in the shared area, and stays in this loop until it becomes available. Then at 96 the SP uses the peer SP MAC address to configure the local firewall 46 to accept messages from the peer SP, e.g., by specifying an "accept" filter using the peer-SP MAC address. Then at 98 the SP brings up the internal network for operation, specifically enabling communications of the inter-SP connections 50 via which the inter-SP messages are sent and received.

FIG. 10 illustrates subsequent use of the firewall. At 100 the firewall is started, and at 102 it is determined whether the firewall has been configured with the peer MAC address. If not, operation may not be safe due to the risk of mis-communication as described above, and thus at 104 all internal traffic is blocked (i.e., no inter-SP communications are forwarded to the local main operating logic for processing). If the firewall has been configured with the peer MAC address, then at 106 normal operation is permitted in which the firewall is relied upon to forward traffic from only the peer SP.

FIG. 11 shows a process of monitoring for changes and updating the firewall configuration as needed. At 110-112, the local SP checks for changes to the peer MAC address recorded in the shared area (e.g., shared device 52). Upon detecting a change, it proceeds to step 114 in which it updates the local copy of the peer MAC address, i.e., the copy in the above-described firewall filter. Then at 116 the SP restarts the local firewall, so that subsequent message filtering is based on the new peer SP MAC address.

As described above, the disclosed technique is used to prevent virtual storage appliance (VSA) nodes (SPs) from communicating improperly with each other. The method uses an area of a shared disk to transfer internal network-interface MAC addresses between peer SPs before the internal network is enabled for operations. It should be noted that alternative shared configuration could be used, such as Open Virtualization Format (OVF) settings or the like within a deploying hypervisor. The internal network is configured to only accept packets from the peer MAC address, which may be done using the mechanism of iptables MAC filtering for example. Also, an Address Resolution Protocol (ARP) table may be statically updated to only send packets to the peer MAC address. The system can also include a service that polls the shared area for MAC address changes (which would be written there upon boot) and automatically updates the iptables rules and ARP table as changes are detected.

While various embodiments of the invention have been particularly shown and described, it will be understood by those skilled in the art that various changes in form and details may be made therein without departing from the spirit and scope of the invention as defined by the appended claims.

What is claimed is:

1. A method of operating one storage processor of a set of virtual-machine-implemented storage processors of a virtual storage appliance, each storage processor including main operating logic and a network interface, comprising:
  receiving a peer-SP identifier uniquely identifying a peer storage processor of the virtual storage appliance in network packets sent by the peer storage processor via an internal inter-SP network;
  using the peer-SP identifier to configure a network firewall of the one storage processor to accept peer-SP packets and reject non-peer-SP packets from the internal inter-SP network, the peer-SP packets containing the peer-SP identifier as an identifier of a packet sender, the non-peer-SP packets not containing the peer-SP identifier as an identifier of a packet sender; and
  subsequently operating the network firewall as configured to accept the peer-SP packets for delivery to the main operating logic of the one storage processor and to reject the non-peer-SP network packets.

2. The method of claim 1, wherein the inter-SP network is realized by a virtual network switch configured to forward the network packets sent by the peer storage processor to the one storage processor.

3. The method of claim 2, wherein the storage processors are executed on respective distinct host computers, and the virtual network switch is a distributed virtual network switch including a physical network switch interconnecting the host computers, along with respective virtual-switch functions within the host computers.

4. The method of claim 1, wherein the network packets include a network-level address of a packet sender and a machine-level address of the packet sender, the network-level address being a statically assigned network address shared by storage processors of different virtual storage appliances, the machine-level address being unique to each storage processor and serving as the peer-SP identifier identifying the peer-SP packets.

5. The method of claim 4, wherein the storage appliances include respective pairs of storage processors denoted A and B, the A storage processors of the storage appliances using a first statically assigned network address, and the B storage processors of the storage appliances using a second distinct statically assigned network address.

6. The method of claim 1, wherein the storage processors have access to a shared storage area to which the storage processors write respective peer-SP identifiers, and wherein receiving a peer-SP identifier includes reading the peer-SP identifier of the peer storage processor from the shared storage area.

7. The method of claim 6, wherein the network packets include a machine-level address of the packet sender, the machine-level address being unique to each storage processor and serving as the peer-SP identifier written to and read from the shared storage area.

8. The method of claim 7, wherein using the peer-SP identifier to configure the network firewall includes configuring an instance of iptables network-address filtering.

9. The method of claim 7, further including statically updating an Address Resolution Protocol table to only send packets to the machine-level address unique to the peer storage processor.

10. The method of claim 7, further including:
  polling the shared storage area for a change of the machine-level address of the peer storage processor; and
  upon the polling detecting a change of the machine-level address, updating the configuration of the network firewall to reflect the change of the machine-level address.

11. A non-transitory computer-readable medium storing computer program instructions of a storage processor of a virtual storage appliance, the computer program instructions being executable by a host computer to cause the host computer to perform a method of operating one storage processor of a set of virtual-machine-implemented storage processors of a virtual storage appliance, each storage processor including main operating logic and a network interface, the method including:
  receiving a peer-SP identifier uniquely identifying a peer storage processor of the virtual storage appliance in network packets sent by the peer storage processor via an internal inter-SP network;
  using the peer-SP identifier to configure a network firewall of the one storage processor to accept peer-SP packets and reject non-peer-SP packets from the internal inter-SP network, the peer-SP packets containing the peer-SP identifier as an identifier of a packet sender, the non-peer-SP packets not containing the peer-SP identifier as an identifier of a packet sender; and
  subsequently operating the network firewall as configured to accept the peer-SP packets for delivery to the main operating logic of the one storage processor and to reject the non-peer-SP network packets.

12. The non-transitory computer-readable medium of claim 11, wherein the inter-SP network is realized by a virtual network switch configured to forward the network packets sent by the peer storage processor to the one storage processor.

13. The non-transitory computer-readable medium of claim 12, wherein the storage processors are executed on respective distinct host computers, and the virtual network switch is a distributed virtual network switch including a physical network switch interconnecting the host computers, along with respective virtual-switch functions within the host computers.

14. The non-transitory computer-readable medium of claim 11, wherein the network packets include a network-level address of a packet sender and a machine-level address of the packet sender, the network-level address being a statically assigned network address shared by storage processors of different virtual storage appliances, the machine-level address being unique to each storage processor and serving as the peer-SP identifier identifying the peer-SP packets.

15. The non-transitory computer-readable medium of claim 14, wherein the storage appliances include respective pairs of storage processors denoted A and B, the A storage processors of the storage appliances using a first statically assigned network address, and the B storage processors of the storage appliances using a second distinct statically assigned network address.

16. The non-transitory computer-readable medium of claim 11, wherein the storage processors have access to a shared storage area to which the storage processors write respective peer-SP identifiers, and wherein receiving a peer-SP identifier includes reading the peer-SP identifier of the peer storage processor from the shared storage area.

17. The non-transitory computer-readable medium of claim 16, wherein the network packets include a machine-level address of the packet sender, the machine-level address being unique to each storage processor and serving as the peer-SP identifier written to and read from the shared storage area.

18. The non-transitory computer-readable medium of claim 17, wherein using the peer-SP identifier to configure the network firewall includes configuring an instance of iptables network-address filtering.

19. The non-transitory computer-readable medium of claim 17, further including statically updating an Address Resolution Protocol table to only send packets to the machine-level address unique to the peer storage processor.

20. The non-transitory computer-readable medium of claim 17, wherein the method performed by execution of the instructions further includes:

polling the shared storage area for a change of the machine-level address of the peer storage processor; and upon the polling detecting a change of the machine-level address, updating the configuration of the network firewall to reflect the change of the machine-level address.

21. The method of claim 1, wherein receiving the peer-SP identifier and using it to configure the network firewall include:

the one SP writing its own machine-level address to a shared area and checking whether a machine-level address of the peer SP is available in the shared area;

upon the machine-level address of the peer SP being available in the shared area, using it to configure the network firewall to accept packets from the peer SP by specifying an accept filter using the machine-level address of the peer SP;

subsequently initiating operation of the internal inter-SP network for operation, specifically enabling communications of inter-SP connections via which the inter-SP packets are sent and received;

by the network firewall, first determining whether the network firewall has been configured with the machine-level address of the peer SP, and if not then blocking all internal traffic by not forwarding inter-SP communications to the main operating logic of the one SP, and if so then permitting normal operation including forwarding inter-SP communications from only the peer SP to the main operating logic of the one SP.

* * * * *